United States Patent
Wu et al.

(10) Patent No.: US 10,589,510 B2
(45) Date of Patent: Mar. 17, 2020

(54) THREE DIMENSIONAL PRINTING METHOD AND THREE DIMENSIONAL PRINTING APPARATUS

(71) Applicants: XYZprinting, Inc., New Taipei (TW); Kinpo Electronics, Inc., New Taipei (TW)

(72) Inventors: Bo-Yi Wu, New Taipei (TW); Yu-Chuan Chang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 284 days.

(21) Appl. No.: 15/613,267

(22) Filed: Jun. 5, 2017

(65) Prior Publication Data

US 2018/0186091 A1   Jul. 5, 2018

(30) Foreign Application Priority Data

Jan. 5, 2017   (TW) .............................. 106100267 A (51) Int. Cl.
| | | |
|---|---|---|
| *B29C 67/00* | (2017.01) | |
| *B33Y 30/00* | (2015.01) | |
| *B33Y 10/00* | (2015.01) | |
| *B29C 64/118* | (2017.01) | |
| *B29C 64/112* | (2017.01) | |
| *B29C 64/20* | (2017.01) | |
| *B29C 64/386* | (2017.01) | |
| *B33Y 50/02* | (2015.01) | |

(52) U.S. Cl.
CPC ............ *B33Y 30/00* (2014.12); *B29C 64/112* (2017.08); *B29C 64/118* (2017.08); *B29C 64/20* (2017.08); *B29C 64/386* (2017.08); *B33Y 10/00* (2014.12); *B33Y 50/02* (2014.12)

(58) Field of Classification Search
CPC ......... B33Y 50/02; B33Y 10/00; B33Y 30/00; B29C 64/386; B29C 64/118; B29C 64/112; B29C 64/20
See application file for complete search history.

(56) References Cited

U.S. PATENT DOCUMENTS

2014/0291893 A1 * 10/2014 Hopkins ............ G05B 19/4099
264/308

\* cited by examiner

*Primary Examiner* — Vishal I Patel
(74) *Attorney, Agent, or Firm* — JCIPRNET (57) ABSTRACT

A three-dimensional (3-D) printing apparatus and a three dimensional printing method are provided. The three dimensional printing method includes following steps. A closed printing path of a closed-contour structure is obtained, wherein the closed printing path includes a printing start point and a printing end point. A printing head is controlled to move from the printing start point and along a front segment of the closed printing path according to a first moving speed, and the printing head is controlled to simultaneously extrude a building material. After the printing head moves along the front segment of the closed printing path, the printing head is controlled to move to the printing end point along a rear segment of the closed printing path according to a second moving speed, and the printing head is controlled to simultaneously extrude the building material. The second moving speed is less than the first moving speed.

6 Claims, 7 Drawing Sheets

THREE DIMENSIONAL PRINTING METHOD AND THREE DIMENSIONAL PRINTING APPARATUS

CROSS-REFERENCE TO RELATED APPLICATION

This application claims the priority benefit of Taiwan application serial no. 106100267, filed on Jan. 5, 2017. The entirety of the above-mentioned patent application is hereby incorporated by reference herein and made a part of this specification.

BACKGROUND

Technical Field

The disclosure relates to a printing apparatus and more particularly, to a three-dimensional (3-D) printing apparatus and a 3-D printing method.

Description of Related Art

With the advance in computer-aided manufacturing (CAM), the manufacturing industry has developed a three-dimensional (3-D) printing technology to rapidly convert original design concept into physical objects. The 3-D printing technology is actually a general designation of a series of rapid prototyping (RP) techniques. A basic principle thereof is an additive manufacturing by using a RP machine to form a sectional shape of a workpiece in an X-Y plane through scanning, and to intermittently shift by a layer thickness along a Z-axis, so as to finally form a 3-D object. The 3-D printing technology is not limited to any geometric shape, and the more complex the components are, the more excellent the RP technology can demonstrate. The 3-D printing technology may greatly save manpower and processing time. With a demand of shortest time, a digital 3-D model designed by using a 3-D computer-aided design (CAD) software may be truthfully presented as touchable.

Taking a fused deposition modeling (FDM) technique as an example, a building material is made into filaments thereby, and then the building material after being heated and melted is stacked layer by layer on a forming platform according to the desired contour, so as to faun a 3-D object. Generally, the 3-D object produced by the 3-D printing apparatus is composed of a peripheral structure and an internal filling structure. Thus, the 3-D printing apparatus usually constructs the peripheral structure of the 3-D object on a printing plane and then, constructs the internal filling structure of the 3-D object on the printing plane. Accordingly, the printing result of the peripheral structure directly influences the printing quality of the 3-D object. However, a non-smooth junction usually appears between a start point and an end point of the peripheral structure in the closed form for various factors, such that a bump appears on the appearance of the printed 3-D object, and the printing quality of the 3-D printing apparatus is reduced.

SUMMARY

Accordingly, the disclosure provides a three-dimensional (3-D) printing apparatus and a 3-D printing method capable of preventing an unexpected bump from appearing to a closed-contour structure of a 3-D object, so as to enhance the printing quality.

According to an embodiment of the disclosure, a three-dimensional (3-D) printing method adapted to manufacture a closed-contour structure on a printing plane is provided. The method includes the following steps. A closed printing path of the closed-contour structure is obtained, wherein the closed printing path includes a printing start point and a printing end point. A printing head is controlled to move from the printing start point and along a front segment of the closed printing path according to a first moving speed, and is controlled to simultaneously extrude a building material. After the printing head moves along the front segment of the closed printing path, the printing head is controlled to move to the printing end point according to the second moving speed along a rear segment of the closed printing path, and is controlled to simultaneously extrude the building material. Herein, the second moving speed is less than the first moving speed.

According to another embodiment of the disclosure, a 3-D printing apparatus adapted to manufacture a 3-D object including a closed-contour structure is provided. The 3-D printing apparatus includes a platform, a printing head, a controller and a processor. The platform includes a carrying surface. The printing head is disposed above the platform. The printing head is configured to move along a printing plane and move along a normal direction of the printing plane. The controller is coupled to the platform and the printing head and controls the printing head according to printing data. The processor is coupled to the controller to provide the printing data and obtains a closed printing path of the closed-contour structure. The closed printing path includes a printing start point and a printing end point. The controller controls the printing head to move from the printing start point and along the front segment of the closed printing path according to a first moving speed, and controls the printing head to simultaneously extrude a building material After the printing head moves along the front segment of the closed printing path, the controller controls the printing head to move to the printing end point according to a second moving speed along the rear segment of the closed printing path, and controls the printing head to simultaneously extrude the building material. Herein, the second moving speed is less than the first moving speed.

To sum up, in the embodiments of the disclosure, when printing the closed-contour structure of the layer object, the printing head first moves along the front segment of the closed printing path according to the first moving speed to simultaneously extrude the building material and then, moves along the rear segment of the closed printing path according to the second moving speed to simultaneously extrude the building material. As the second moving speed is less than the first moving speed, the printing head can be prevented from pulling the building material which is incompletely cured to a place out of expectation due to moving too fast at the junction of the closed printing path. Thereby, the occurrence of a gap between the printed 3-D object and the actual expectation can be avoided.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

Figure 1:
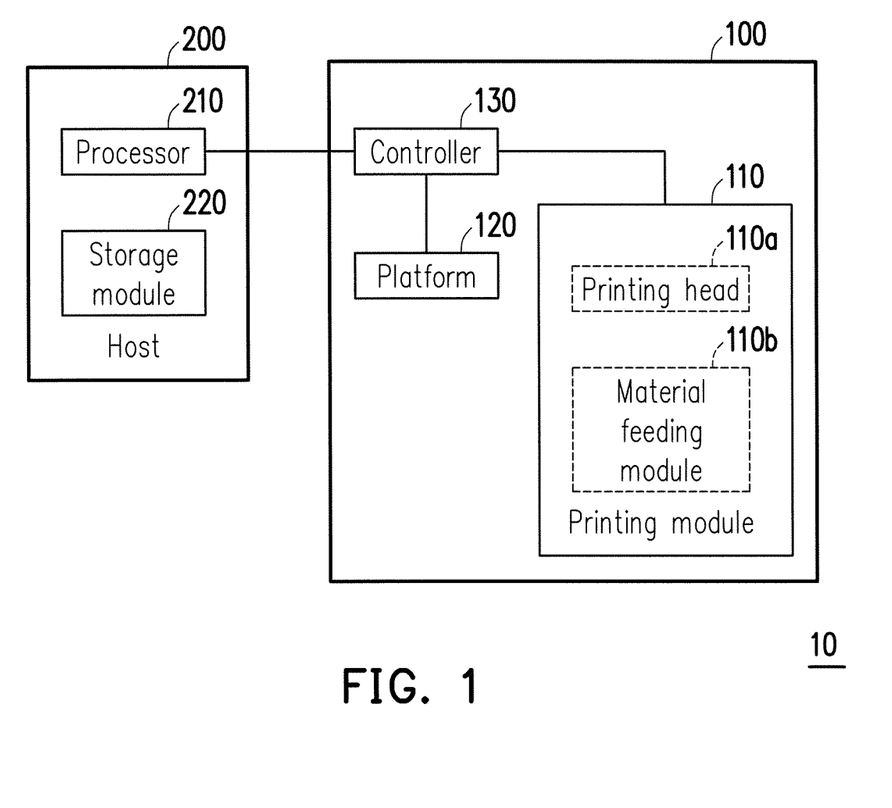
FIG. 1 is a schematic block diagram illustrating a three-dimensional (3-D) printing apparatus according to an embodiment of the disclosure.

FIG. 1 is a schematic block diagram illustrating a three-dimensional (3-D) printing apparatus according to an embodiment of the disclosure. Referring to FIG. 1, a 3-D printing apparatus 10 of the present embodiment includes a printing apparatus 100 and a host 200. The 3-D printing apparatus 10 is adapted to print a 3-D object according to a 3-D digital model. Furthermore, the host 200 is an apparatus with computation capability, for example, a notebook computer, a tablet computer or a desktop computer, and the type of the host 200 is not limited in the disclosure. The host 200 may edit and process the 3-D digital model, and transmit related printing information to the printing apparatus 100, such that the printing apparatus 100 may print a 3-D object according to the printing information.

In the present embodiment, the 3-D digital model may be a 3-D digital image file, which may be constructed by, for example, the host 200 through computer-aided design (CAD) or animation modeling software. In addition, the host 200 performs layer processing on the 3-D digital model to obtain layer information associated with a plurality of layer objects, such that the printing apparatus 100 may sequentially printing out each layer object according to the layer information corresponding to the layer objects, so as to finally form a complete 3-D object. However, the disclosure does not limit the host and the printing apparatus to pertain to implementation aspects of different hardware apparatuses. In another embodiment, the 3-D printing apparatus may be implemented in a form of a printing apparatus including a processor.

Referring to FIG. 1 continuously, the printing apparatus 100 is coupled to the host 200, the host 200 includes a processor 210 and a storage module 220. The processor 210 is, for example, a central processing unit (CPU) or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices, which is not limited in the disclosure.

The storage module 220 is, for example, any type of a stationary or mobile random access memory (RAM), read-only memory (ROM), flash memory, hard drive or other similar devices or a combination of the above-mentioned devices. The storage module 220 stores a plurality of instructions, and the instructions and programs may be loaded by the processor 210 to execute, so as to edit and process the 3-D digital model.

It should be mentioned that the 3-D digital model has to be further compiled and computed, so as to generate printing control information which is accessible by the printing apparatus 100 to perform the printing operation. Specifically, the processor 210 of the host 200 first performs layer processing on the 3-D model to generate the layer information associated with a plurality of layer objects. Generally, the processor 210 is configured to cut the 3-D model with a layer plane by a fixed interval, so as to fetch sectional contours of the layer objects.

The processor 210 is further configured to generate a corresponding control code file according to the sectional contour of each layer object. In this case, the control code file is the printing control information accessibly by the printing apparatus 100 to perform the printing operation. In other words, a controller 130 of the printing apparatus 100 controls the components in the printing apparatus 100 according to the control code file, so as to form each layer object lay by layer on a platform 120. In an embodiment, the control code file is, for example, a G code file.

Figure 2:
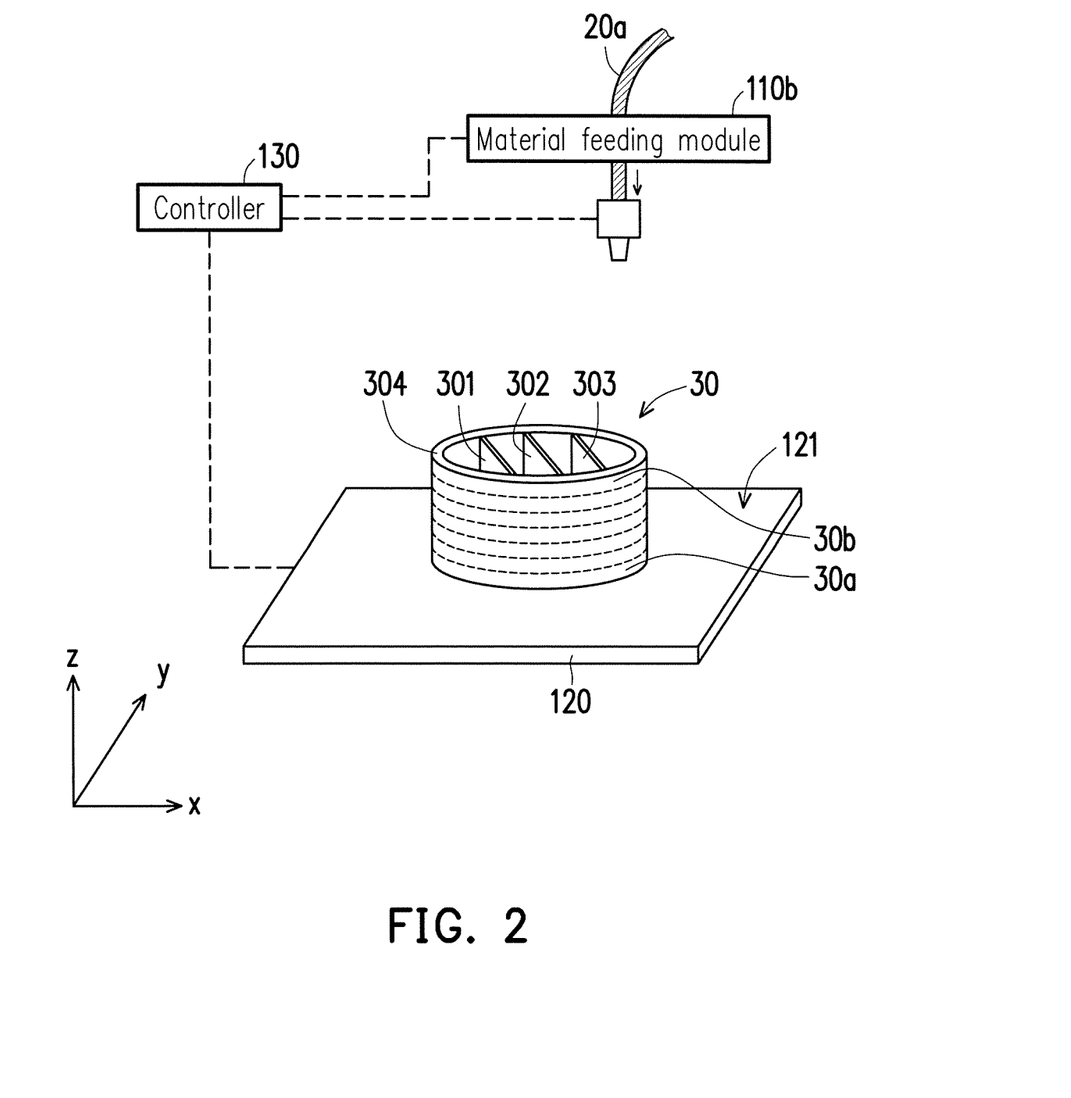
FIG. 2 is a schematic illustrating a 3-D printing apparatus according to an embodiment of the disclosure.

The printing apparatus 100 is adapted to print out a 3-D object according to the printing information transmitted from the host 200. Specifically, the controller 130 controls each component of the printing apparatus 100 according to the printing control information, so as to repeatedly print out a building material on a specific position until the whole 3-D object is formed. FIG. 2 is a schematic illustrating the 3-D printing apparatus according to an embodiment of the disclosure. Referring to both FIG. 1 and FIG. 2, in the present embodiment, the printing apparatus 100 includes a printing module 100, the platform 120 and the controller 130. In the meantime, a coordinate system is also provided here for the convenience of describing the components and moving state thereof. The platform 120 includes a carrying surface 121. The printing module 110 is disposed above the platform 120 and includes a printing head 110a and a material feeding module 110b. The printing head 110a is configured to move along an X-Y plane and along a normal direction of the X-Y plane (which is a Z-axial direction) to print each layer object (e.g., a layer object 30a and a layer object 30b) layer by layer on the carrying surface 121, so as to gradually form a 3-D object 30.

Furthermore, in the present embodiment, a building material 20a may be a hot melt wire material adaptive for fused filament fabrication (FFF). The material feeding module 110b feeds the building material 20a into the printing head 110a. The printing head 110a heats the building material 20a, such that the building material 20a which is fed into the printing head 110a is melted into a fluid material in a molten state, and then, the high-temperature building material in a molten state is extruded out by the printing head 110a.

Accordingly, the building material in the molten state is cured layer by layer on the carrying surface 121, so as to form the 3-D object 30.

Additionally, the controller 130 is coupled to the printing head 110a and the platform 120 to control overall operation of the printing apparatus 100 according to the printing information, so as to print out the 3-D object 30. For example, the controller 130 may control a moving path of the printing head 110a according to the printing information, control a feeding amount of the material feeding module 110b, or control a moving speed of the printing head 110a. The controller 130 is a device with computation capability, for example, a CPU, a chipset, a microprocessor, a microcontroller or the like, which is not limited in the disclosure.

Figure 3:
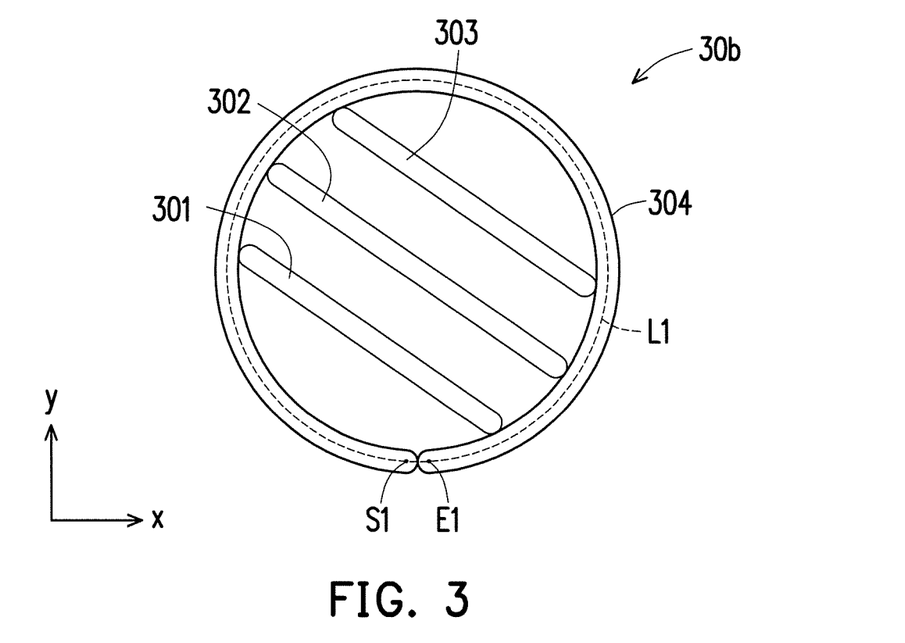
FIG. 3 is a schematic diagram of an example of the layer object according to an embodiment of the disclosure.

It should be mentioned that in the embodiment illustrated in FIG. 2, the 3-D object 30 is constructed by a peripheral structure and an interior structure. In other words, each layer object which is stacked to form the 3-D object 30 includes a closed-contour structure and internal filling structures. Taking the layer object 30b as an example, FIG. 3 is a schematic diagram of an example of the layer object according to an embodiment of the disclosure. Referring to FIG. 3, the layer object 30b includes a closed-contour structure 304 and internal filling structures 301, 302 and 303. Generally, through the control of the controller 130, the printing head 110a continues to print the internal filling structures 301, 302 and 303 after the printing of the closed-contour structure 304 is completed. To be specific, after performing the layer processing on the 3-D digital model, the processor 210 may obtain a closed printing path L1 of the layer object 30b, and the closed printing path L1 includes a plurality of anchor points including a printing start point S1 and a printing end point E1. The controller 130 controls the printing head 110a to move from the printing start point S1 to the other anchor point sequentially and arrive at the printing end point E1. In other words, the controller 130 controls the printing head 110a to move along the closed printing path L1 and simultaneously extrude the building material, and thereby, the closed-contour structure 304 of the layer object 30b is constructed on the platform 120. It should be noted that the building material extruded by the printing head 110a just above the printing start point S1 contacts the building material extruded by the printing head 110a just above the printing end point E1, and in this way, the closed-contour structure 304 is a closed-ring structure.

Figure 4:
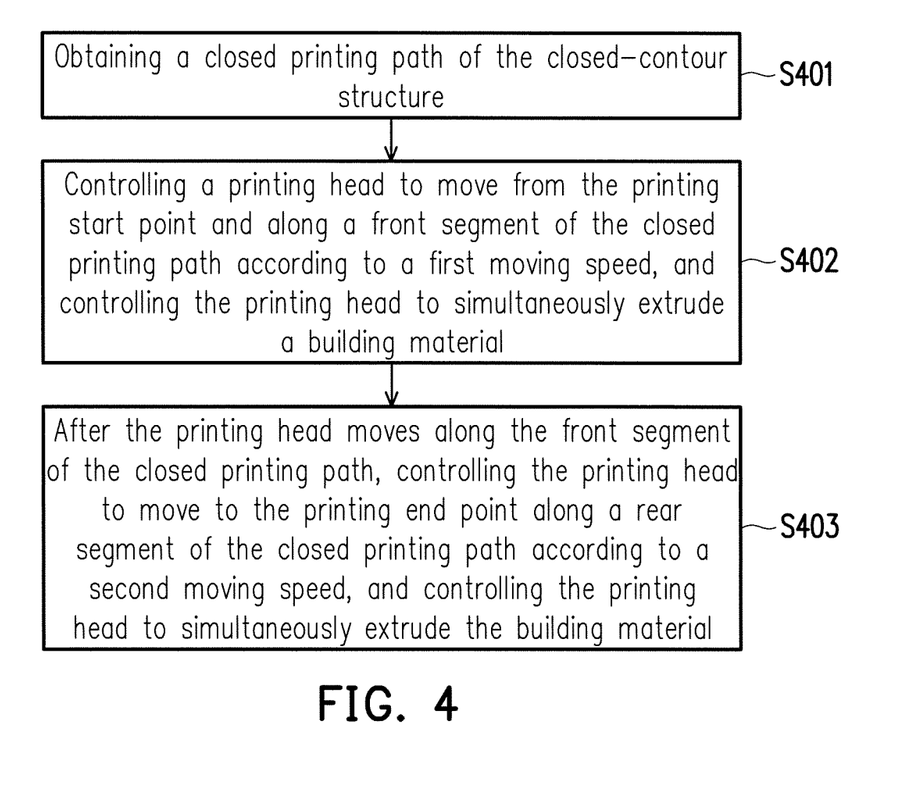
FIG. 4 is a flowchart illustrating a 3-D printing method according to an embodiment of the disclosure.

FIG. 4 is a flowchart illustrating a 3-D printing method according to an embodiment of the disclosure. The method of the present embodiment is applicable to the 3-D printing apparatus 10 illustrated in FIG. 1, and steps of the 3-D printing method of the present embodiment will be described in detail with reference to each component in the 3-D printing apparatus 10. In order to conveniently describe the disclosure, the 3-D printing apparatus 10 printing the closed-contour structure 304 illustrated in FIG. 3 will be continuously taken as an example for describing the embodiment illustrated in FIG. 4.

In step S401, the processor 210 obtains the closed printing path L1 of the closed-contour structure 304, where the closed printing path L1 includes the printing start point S1 and the printing end point E1. Briefly speaking, after performing the layer processing on the 3-D digital model, the processor 210 may obtain the closed printing path L1 of the closed-contour structure 304. The processor 210 transmits the printing information corresponding to the closed printing path L1 to the controller 130, such that the controller 130 may control the printing head 110a to move along the closed printing path L1 on a printing plane (i.e., the X-Y plane), so as to print out the closed-contour structure 304.

Figure 5:
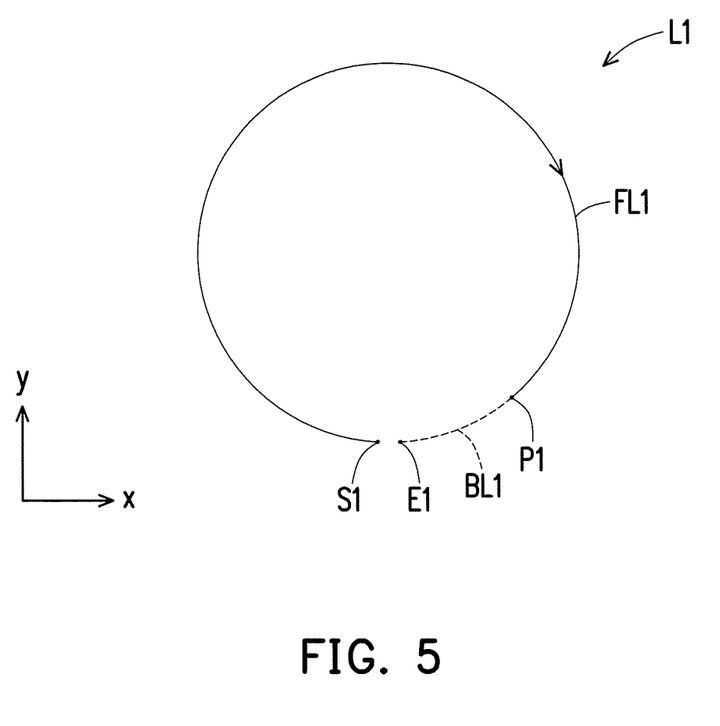
FIG. 5 is a schematic diagram of an example of a closed printing path according to an embodiment of the disclosure.

Furthermore, referring to FIG. 5, FIG. 5 is a schematic diagram of an example of a closed printing path according to an embodiment of the disclosure. In step S402, the controller 130 controls the printing head 110a to move from the printing start point S1 and along a front segment FL1 of the closed printing path L1 according to a first moving speed, and controls the printing head 110a to simultaneously extrude the building material. In this way, the building material in the molten state is coated on the previously printed layer object, while a part of the closed-contour structure 304 is then formed on the platform 120.

Then, in step S403, after the printing head 110a moves along the front segment FL1 of the closed printing path L1, the controller 130 controls the printing head 110a to move to the printing end point E1 according to a second moving speed along a rear segment BL1 of the closed printing path L1, and controls the printing head 110a to simultaneously extrude the building material. It should be noted that the second moving speed on the rear segment BL1 is less than the first moving speed of the front segment FL1. To be specific, the controller 130 reduces the moving speed of the printing head 110a after the printing head 110a moves from the printing start point S1 to a relay point P1 at the first moving speed. Thereby, the printing head 110a continues to move from the relay point P1 to the printing end point E1 at the slower second moving speed, so as to complete the printing of the closed-contour structure 304. In this way, a bump may be prevented from being formed at a junction between the printing start point S1 and the printing end point E1 of the closed-contour structure 304.

Figure 6:
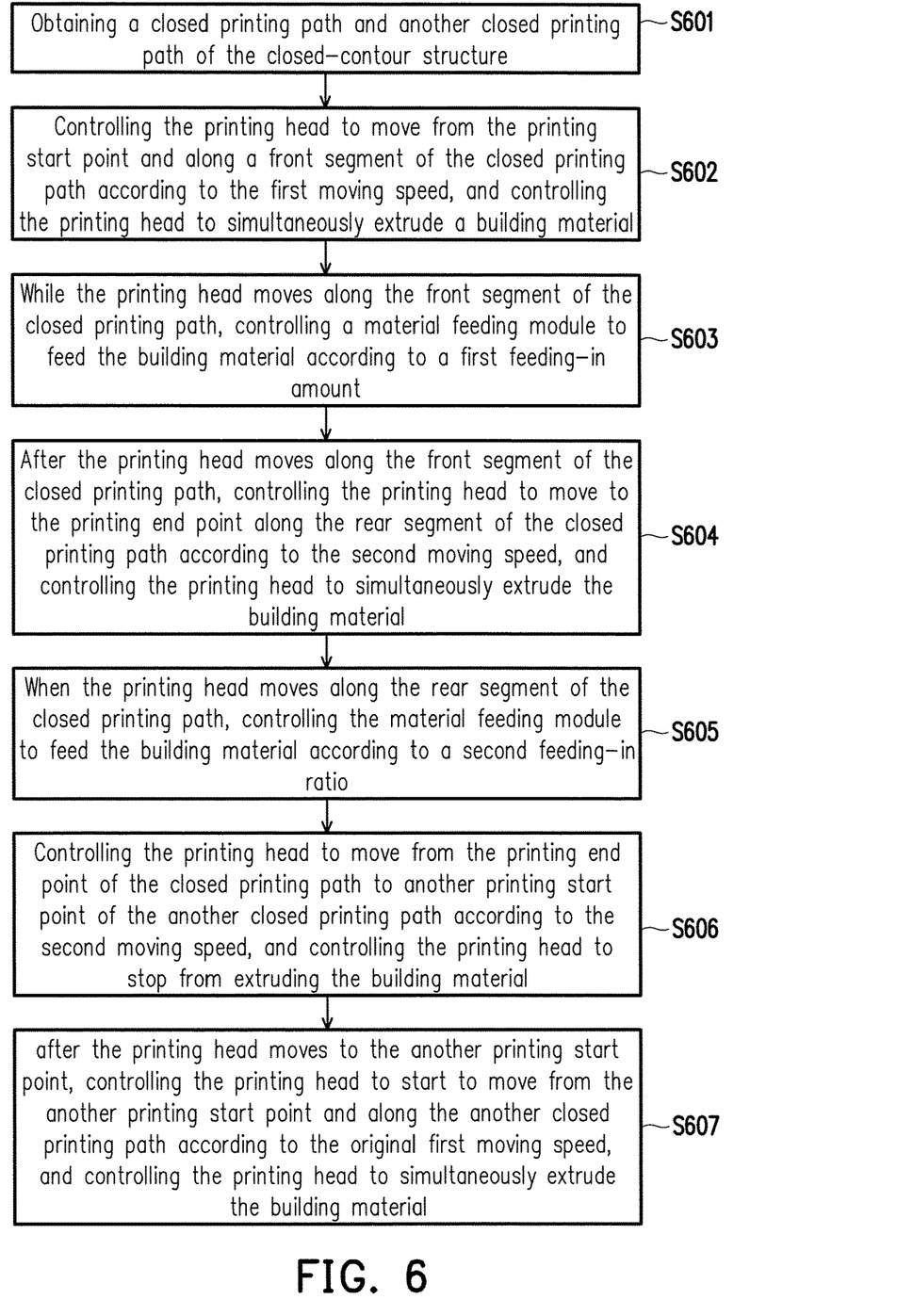
FIG. 6 is a flowchart illustrating a 3-D printing method according to an embodiment of the disclosure.
Figure 7A:
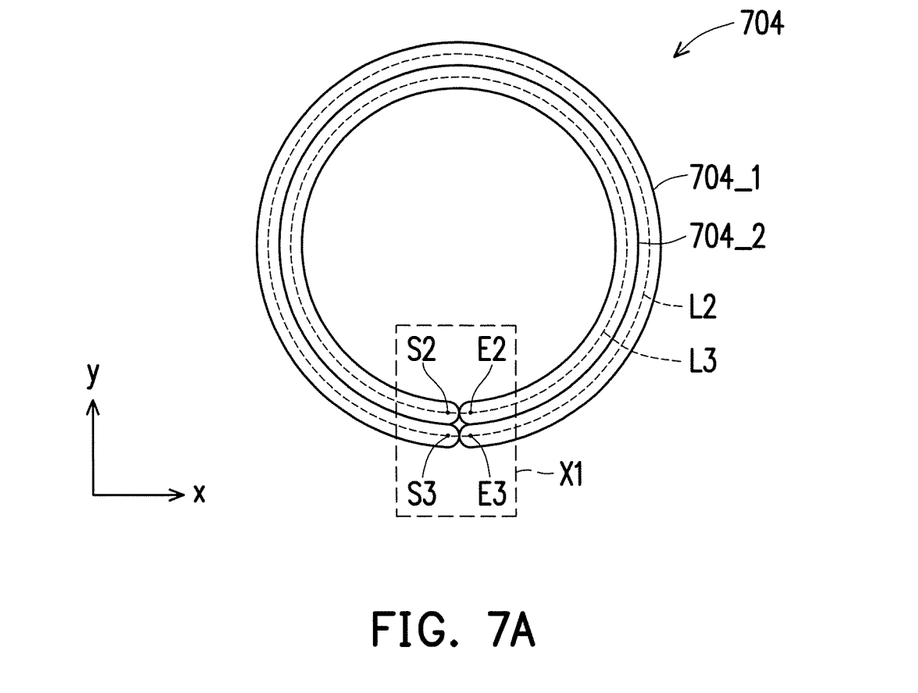
FIG. 7A is a schematic diagram of an example of a closed-contour structure according to an embodiment of the disclosure.
Figure 7B:
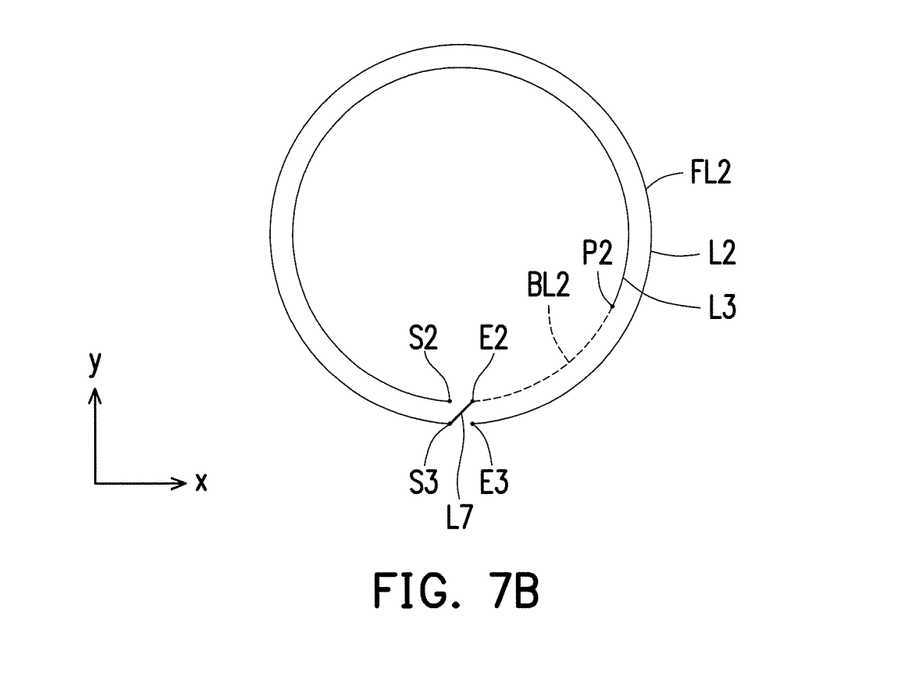
FIG. 7B is a schematic diagram of an example of a closed printing path according to an embodiment of the disclosure.

FIG. 6 is a flowchart illustrating a 3-D printing method according to an embodiment of the disclosure. The method of the present embodiment is applicable to the 3-D printing apparatus 10 illustrated in FIG. 1, and steps of the 3-D printing method of the present embodiment will be described in detail with reference to each component in the 3-D printing apparatus 10. It should be mentioned that the closed-contour structure of the layer object may be formed by one or more circles of sub structures to increase firmness of the 3-D object. FIG. 7A is a schematic diagram of an example of a closed-contour structure according to an embodiment of the disclosure. FIG. 7B is a schematic diagram of an example of a closed printing path according to an embodiment of the disclosure. As illustrated in FIG. 7A, a closed-contour structure 704 including an interior structure 704_2 and a peripheral structure 704_1 is taken as an example for description, but the disclosure is not limited thereto. In other embodiment, the closed-contour structure may include more sub structures.

In step S601, the processor 210 obtains a closed printing path L3 and another closed printing path L2 of the closed-contour structure 704. The closed printing path L3 in the interior includes a printing start point S2 and a printing end point E2, and the closed printing path L2 in the outer periphery includes a printing start point S3 and the printing end point E3. In brief, after performing the layer processing on the 3-D digital model, the processor 210 may obtain the closed printing path L3 of the interior structure 704_2 and another closed printing path L2 of the peripheral structure 704_1. The closed printing path L3 is used for constructing the interior structure 704_2 of the closed-contour structure, and the closed printing path L2 is used for printing the peripheral structure 704_1 of the closed-contour structure. The processor 210 transmits printing information corresponding to the closed printing path L3 and the closed printing path L2 to the controller 130, such that the controller 130 may control the printing head 110a to move along the closed printing path L3 and the closed printing path L2, so as to print out the interior structure 704_2 and the peripheral structure 704_1.

Referring to FIG. 7B, it is assumed herein that the controller 130 controls the printing head 110a to first print the interior structure 704_2 and then the peripheral structure 704_1, and the peripheral structure 704_1 covers the interior structure 704_2, but the disclosure is not limited thereto. In another embodiment, the controller 130 may control the printing head 110a to first print the peripheral structure 704_1 and then the interior structure 704_2. In other words, the closed printing path which is first printed is used for constructing the peripheral structure of the closed-contour structure, and the another closed printing path which is printed later is used for printing the interior structure of the closed-contour structure. Namely, the sequence of printing the interior structure and the peripheral structure is not limited in the disclosure.

After obtaining the printing information corresponding to closed printing path L3 and the closed printing path L2, in step S602, the controller 130 controls the printing head 110a to move from the printing start point S2 and along the front segment FL2 of the closed printing path L3 according to the first moving speed, and controls the printing head 110a to simultaneously extrude the building material. In step S603, while the printing head 110a moves along the front segment FL2 of the closed printing path L3, the controller 130 controls the material feeding module 110b feeds the building material 20a according to a first feeding-in ratio. The controller 130 may control the printing head 110a to extrude the building material in the first feeding-in ratio, for example, by controlling a rotation speed of the material feeding module 110b.

In step S604, after the printing head 110a moves along the front segment FL2 of the closed printing path L3, the controller 130 controls the printing head 110a to move to the printing end point E2 according to the second moving speed along the rear segment BL2 of the closed printing path L3, and controls the printing head 110a to simultaneously extrude the building material 20a. In step S605, while the printing head 110a moves along the rear segment BL2 of the closed printing path L3, the controller 130 controls the material feeding module 110b to feed the building material 20a according to a second feeding-in ratio. In this case, the first feeding-in ratio of the building material 20a extruded by the printing head 110a on the front segment FL2 is different from the second feeding-in ratio of the building material 20a extruded by the printing head 110a on the rear segment BL2. In other words, the first feeding-in ratio on the first feeding-in front segment FL2 may be greater than the second feeding-in ratio on the rear segment BL2, or, alternatively, the first feeding-in ratio on the front segment FL2 may be less than the second feeding-in ratio on the rear segment BL2. Through reducing the feeding-in ratio of the front segment or the rear segment, a bump which appears at the junction X1 due to the accumulation of the surplus building material may be prevented. The description will be continued below by taking the first feeding-in ratio on the front segment FL2 being greater than the second feeding-in ratio on the rear segment BL2, but the disclosure is not limited thereto.

To be specific, after the printing head 110a moves from the printing start point S2 to the relay point P2 at the first moving speed and according to the first feeding-in ratio, the controller 130 reduces the moving speed and the feeding-in ratio of the printing head 110a. Thus, the printing head 110a continues to move from the relay point P2 to the printing end point E2 at the slower second moving speed and according to the lower second feeding-in ratio, so as to complete the printing of the interior structure 704_2.

After the interior structure 704_2 is printed, in step S606, the controller 130 controls the printing head 110a to move from the printing end point E2 of the closed printing path L3 to another printing start point S3 of the closed printing path L2 according to the second moving speed, and controls the printing head 110a to stop from extruding the building material. Namely, after the interior structure 704_2 is printed, the controller 130 controls the printing head 110a to stop from moving to the printing start point S3 of the closed printing path L2 along a material extrusion-stopping path L7 according to the second moving speed. In this way, since the printing head 110a moves to the printing start point S3 at the slower second speed, the building material which is not completely cured may be prevented from being pulled from the printing end point E2 to the printing start point S3.

Then, in step S607, after the printing head 110a moves to the printing start point S3, the controller 130 controls the printing head 110a to start to move from the printing start point S3 and along the closed printing path L2 according to the original first moving speed, and controls the printing head 110a to simultaneously extrude the building material. In the same way, the controller 130 may also control the printing head 110a to slow down on the rear segment of the closed printing path L2. As the printing head 110a arrives at the printing end point E3 of the closed printing path L2, the whole closed-contour structure 704 is also formed above the platform 120. In this way, when the 3-D printing apparatus 10 prints the closed-contour structure 704, the bump which appears at the junction X1 due to the accumulation of the surplus building material may be prevented through controlling the moving speed and the feeding-in ratio of the printing head 110a.

In an embodiment of the disclosure, the bump may be further prevented from appearing in the closed-contour structure through changing a position of the printing start point or a position of the printing end point. Furthermore, after the layer processing is performed, and the original printing start point and printing end point are obtained, the processor 210 may adjust a coordinate position of one of the printing start point and the printing end point to shift the one of the printing start point and the printing end point toward an internal area covered by the closed printing path. In this way, the printing head 110a moves along an inward-shifted segment and an original segment of the closed printing path, and the inward-shifted segment of the closed printing path includes the adjusted one of the printing start point and the printing end point. To be specific, when the processor 210 adjusts the coordinate position of the printing start point, a start point of the inward-shifted segment of the closed printing path is the adjusted printing start point. When the processor 210 adjusts the coordinate position of the printing end point, an end point of the inward-shifted segment of the closed printing path is the adjusted printing end point. It is to be mentioned that the processor 210 may also adjust both the printing start point and the printing end point of the closed printing path, such that the closed printing path includes two inward-shifted segments at the beginning and the end.

Figure 8A:
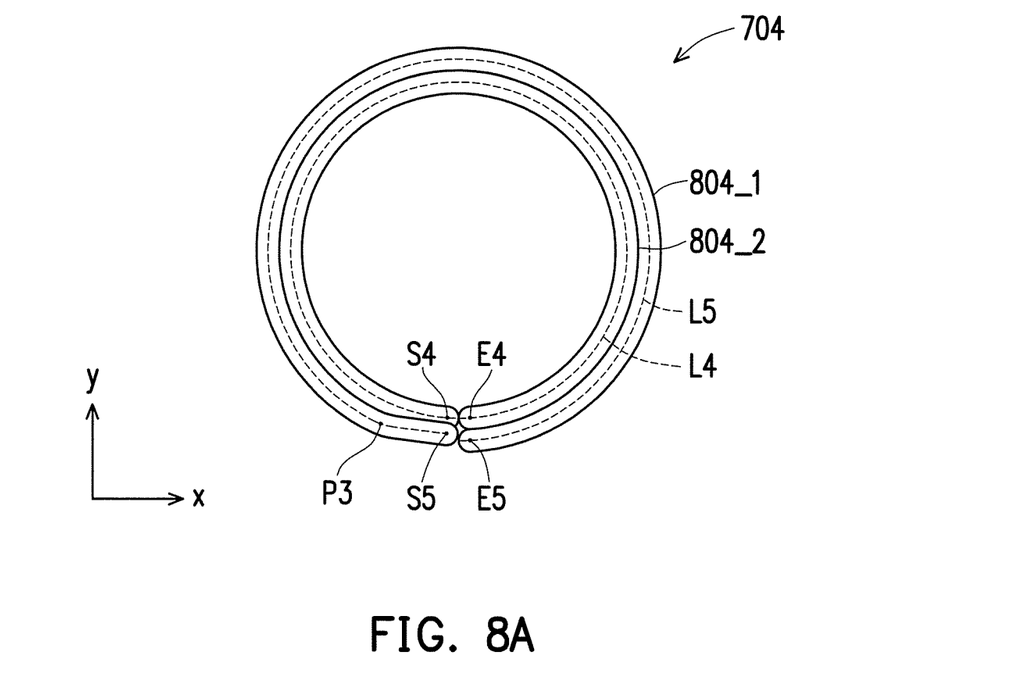
FIG. 8A is a schematic diagram of an example of a closed-contour structure according to an embodiment of the disclosure.
Figure 8B:
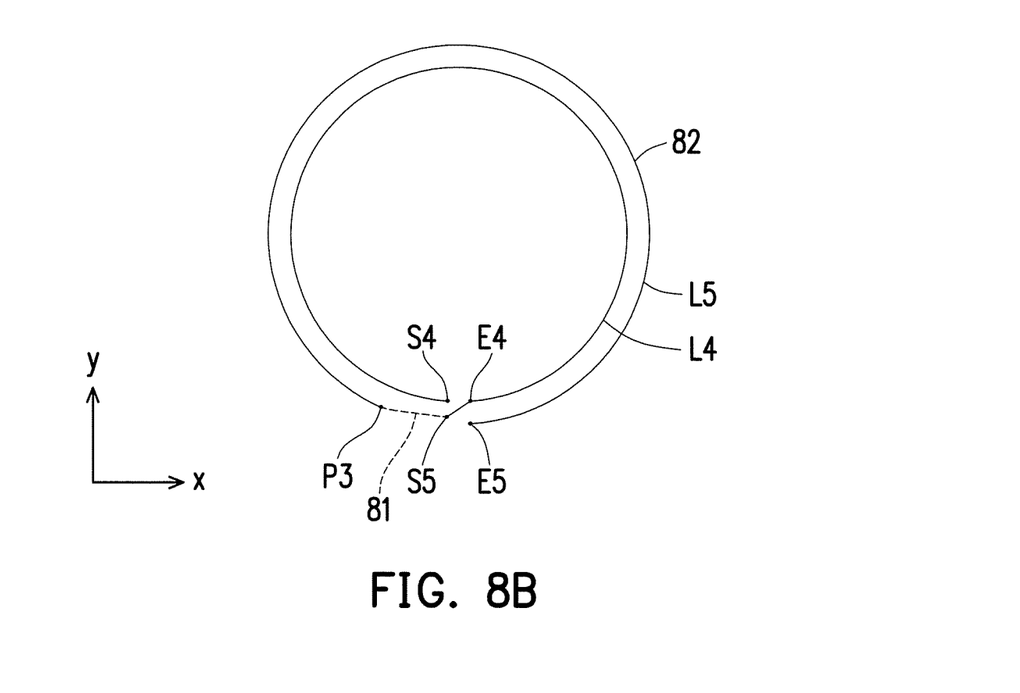
FIG. 8B is a schematic diagram of an example of a closed printing path according to an embodiment of the disclosure.

Taking the coordinate position of the printing start point adjusted by the processor 210 and the start point of the inward-shifted segment of the closed printing path being the adjusted printing start point as an example, FIG. 8A is a schematic diagram of an example of a closed-contour structure according to an embodiment of the disclosure, and FIG. 8B is a schematic diagram of an example of a closed printing path according to an embodiment of the disclosure. Referring to both FIG. 8A and FIG. 8B, a closed-contour structure 804 includes an interior structure 804_2 and a peripheral structure 804_1. After the controller 130 controls the printing head 110a to first move from the printing start point S4 and along a closed printing path L4 to the printing end point E4, the printing head 110a shifts to an adjusted printing start point S5. As illustrated in FIG. 8A and FIG. 8B, as a coordinate position of the printing start point S5 is adjusted by the processor 210, the adjusted printing start point S5 shifts toward an internal area covered by a closed printing path L5. An inward-shifted segment 81 includes the adjusted printing start point S5. Thus, the controller 130 controls the printing head 110a to move from the printing start point S5 to a relay point P3 along the inward-shifted segment 81 of the closed printing path L5 and then, further controls the printing head 110a to move from the relay point P3 to a printing end point E5 along an original segment 82 of the closed printing path L5. In this way, a bump which appears at the printing junction of the peripheral structure may be prevented by shifting the printing start point or the printing end point of the peripheral structure toward the internal of the closed-contour structure.

To summarize, in the embodiments of the disclosure, when printing the closed-contour structure of the layer object, the printing head first moves on the front segment of the closed printing path according to the first moving speed and extrudes the building material in the first feeding-in ratio, and then, moves along the rear segment of the closed printing path according to the second moving speed and simultaneously extrudes the building material in the second feeding-in ratio. Both the second speed and the second feeding-in ratio on the rear segment are less than the first speed and the first feeding-in ratio on the front segment. In this way, through reducing the speed and the feeding-in ratio on the rear segment of the closed printing path, the printing head can be prevented from pulling the building material which is incompletely cured to a place out of expectation due to moving too fast at the junction of the closed printing path. Thereby, an unexpected bump can be prevented from appearing to the surface of the printed 3-D object, so as to enhance the printing quality of the 3-D printing apparatus. Moreover, through adjusting the printing start point or the printing end point of the closed printing path, the closed-contour structure can be prevented from encountering the bump which protrudes outward, as well as the 3-D printing quality can be improved.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A three-dimensional (3-D) printing method, adapted to manufacture a closed-contour structure on a printing plane, comprising:
    obtaining a closed printing path of the closed-contour structure, wherein the closed printing path comprises a printing start point and a printing end point;
    controlling a printing head to move at a first moving speed on the printing plane from the printing start point and along a front segment of the closed printing path, and controlling the printing head to simultaneously extrude a building material; and
    after the printing head moves at the first moving speed along the front segment of the closed printing path, controlling the printing head to move at a second moving speed on the printing plane to the printing end point along a rear segment of the closed printing path, and controlling the printing head to simultaneously extrude the building material, wherein the second moving speed is less than the first moving speed.

2. The 3-D printing method according to claim 1, further comprising:
    controlling the printing head to move from the printing end point of the closed printing path to another printing start point of another closed printing path according to the second moving speed, and controlling the printing head to stop from extruding the building material; and
    after the printing head moves to the another printing start point, controlling the printing head to start to move from the another printing start point and along the another closed printing path according to the first moving speed, and controlling the printing head to simultaneously extrude the building material.

3. The 3-D printing method according to claim 2, wherein the closed-contour structure comprises an interior structure and a peripheral structure, the peripheral structure covers the interior structure, the closed printing path is used for printing the interior structure of the closed-contour structure, and the another closed printing path is used for printing the peripheral structure of the closed-contour structure.

4. The 3-D printing method according to claim 2, wherein the closed-contour structure comprises an interior structure and a peripheral structure, the peripheral structure covers the interior structure, the closed printing path is used for printing the peripheral structure of the closed-contour structure, and the another closed printing path is used for printing the interior structure of the closed-contour structure.

5. The 3-D printing method according to claim 1, further comprising:
    while the printing head moves along the front segment of the closed printing path, controlling a material feeding module to feed the building material according to a first feeding-in ratio; and
    while the printing head moves along the rear segment of the closed printing path, controlling the material feeding module to feed the building material according to a second feeding-in ratio, wherein the first feeding-in ratio is different from the second feeding-in ratio.

6. The 3-D printing method according to claim 1, further comprising:
    adjusting a coordinate position of one of the printing start point and the printing end point, so as to shift the one of the printing start point and the printing end point toward an internal area covered by the closed printing path; and
    controlling the printing head to move from the printing start point to the printing end point along an inward-shifted segment and an original segment of the closed printing path, and controlling the printing head to extrude the building material, wherein the inward-shifted segment comprises the one of the printing start point and the printing end point.

* * * * *